United States Patent
Miyazaki

(10) Patent No.: US 8,446,384 B2
(45) Date of Patent: May 21, 2013

(54) INFORMATION PROCESSING APPARATUS, INFORMATION PROCESSING METHOD AND PROGRAM

(75) Inventor: Reiko Miyazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 13/041,053

(22) Filed: Mar. 4, 2011

(65) Prior Publication Data

US 2011/0221693 A1  Sep. 15, 2011

(30) Foreign Application Priority Data

Mar. 11, 2010  (JP) ................ P2010-054934

(51) Int. Cl.
*G06F 3/041*  (2006.01)
(52) U.S. Cl.
USPC .......................................... 345/173; 345/179
(58) Field of Classification Search
USPC ....... 345/173, 174, 179, 156, 157; 178/18.01, 178/19.04; 200/512, 515
See application file for complete search history.

(56) References Cited

U.S. PATENT DOCUMENTS

| | | | | |
|---|---|---|---|---|
| 5,119,079 A | * | 6/1992 | Hube et al. | 715/823 |
| 6,073,036 A | * | 6/2000 | Heikkinen et al. | 455/550.1 |
| 6,803,905 B1 | * | 10/2004 | Capps et al. | 345/173 |
| 7,614,008 B2 | * | 11/2009 | Ording | 715/773 |
| 7,653,883 B2 | * | 1/2010 | Hotelling et al. | 715/863 |
| 2006/0232551 A1 | * | 10/2006 | Matta | 345/156 |
| 2007/0046641 A1 | * | 3/2007 | Lim | 345/173 |
| 2009/0027334 A1 | * | 1/2009 | Foulk et al. | 345/157 |
| 2010/0066695 A1 | * | 3/2010 | Miyazaki | 345/173 |
| 2010/0208138 A1 | * | 8/2010 | Mohri et al. | 348/570 |
| 2011/0285657 A1 | * | 11/2011 | Shimotani et al. | 345/173 |

FOREIGN PATENT DOCUMENTS

| | | |
|---|---|---|
| JP | 2-136914 | 5/1990 |
| JP | 5-197471 | 8/1993 |
| JP | 6-234909 | 9/1996 |
| JP | 2002-297293 | 10/2002 |
| JP | 2008-009759 | 1/2008 |

* cited by examiner

*Primary Examiner* — Joe H Cheng
(74) *Attorney, Agent, or Firm* — Sherr & Jiang, PLLC

(57) ABSTRACT

There is provided an information processing apparatus including a detecting unit detecting a pressing force applied by an operating body that presses a surface of a display unit displaying a plurality of input regions operated by the operating body, and a region control unit operable when it has been determined from a detection result of the detecting unit that the operating body has pressed one of the input regions with a pressing force that is equal to or above a predetermined value, to enlarge the input region being pressed by the operating body and to move at least one of the input regions so that adjacent input regions do not overlap one another.

14 Claims, 11 Drawing Sheets

INFORMATION PROCESSING APPARATUS, INFORMATION PROCESSING METHOD AND PROGRAM

BACKGROUND OF THE INVENTION

1. Field of the Invention

The present invention relates to an information processing apparatus, information processing method and program, and more particularly to an information processing apparatus including an on-screen keyboard, information processing method and program.

2. Description of the Related Art

Since a touch sensor can realize an intuitive and user-friendly user interface, it has been used in ticketing machines in transportation facilities or ATMs in banks in related art. In recent years, the touch sensor can detect a user' operation, thereby realizing device operations which have not been found in button operations in related art. Thus, recently, the touch sensor has been widely used in portable devices such as cell phone or game device.

Some devices having a touch panel mounted thereon include not a physical keyboard but an on-screen keyboard as software keyboard by which characters are input from a screen (Japanese Patent Application Laid-Open No. 2002-297293, Japanese Patent Application Laid-Open No. 08-234909, Japanese Patent Application Laid-Open No. 05-197471, Japanese Patent Application Laid-Open No. 02-136914, and Japanese Patent Application Laid-Open No. 2008-9759, for example). There was an issue in the on-screen keyboard that a user can easily input characters while the keys are blocked by a user's finger. A solution for recognizing a user-focusing key is conducted against the above issue. For example, in Japanese Patent Application Laid-Open No. 2002-297293, Japanese Patent Application Laid-Open No. 08-234909, Japanese Patent Application Laid-Open No. 05-197471, Japanese Patent Application Laid-Open No. 02-136914, and Japanese Patent Application Laid-Open No. 2008-9759, there is performed a processing in which a user-focusing key and its surrounding keys are enlarged in size and the focused key is offset to be displayed outside a finger-blocking region.

SUMMARY OF THE INVENTION

However, there was an issue that an enlargement of key causes adjacent keys to block each other in the key enlargement processing. Further, in a key movement processing, a user moves his/her finger on a screen while touching a key, and then moves the finger away from the screen after confirming the display, thereby fixing the key. However, when the user-touched position is on the user-intended key, the user can perform a tap operation to fix the key, but when the user-touched position is not on the user-intended key, the user has to move the finger onto the intended key. This is because once the user moves a finger away from the screen, the operation on the presently-focused key is fixed and the user has to perform an operation of canceling the key operation. There is easily assumed that such erroneous key touching is considered to frequently occur, which imposes user's operation load.

The present invention has been therefore made in views of the above issues, and it is desirable to provide a novel and improved information processing apparatus, information processing method and program capable of smoothly performing key inputting on an on-screen keyboard.

According to an embodiment of the present invention, there is provided an information processing apparatus including a detecting unit detecting a pressing force applied by an operating body that presses a surface of a display unit displaying a plurality of input regions operated by the operating body, and a region control unit operable when it has been determined from a detection result of the detecting unit that the operating body has pressed one of the input regions with a pressing force that is equal to or above a predetermined value, to enlarge the input region being pressed by the operating body and to move at least one of the input regions so that adjacent input regions do not overlap one another.

According to the present invention when the detecting unit detects that an operating body is pressing a display unit with a pressing force that is equal to or greater than a predetermined value, the region control unit enlarges the input region pressed by the operating body. Together with this, at least one of the input regions is moved so that adjacent input regions do not overlap. By enlarging an input region and avoiding overlapping of the input regions in this way, it is possible for the user to easily select a desired input region and possible to prevent the user from erroneously selecting another input region.

Here, the region control unit may include a size deciding unit deciding a size of the input region after enlargement depending on the pressing force of the operating body, and an ideal position calculating unit calculating ideal positions where the adjacent input regions do not overlap each other after enlargement has been carried out.

Moreover, the ideal position calculating unit may include an overlap avoidance region deciding unit deciding an overlap avoidance region that enables an input region to avoid overlapping other input regions after enlargement has been carried out, a pair deciding unit deciding a pair of the adjacent input regions, an ideal relative position deciding unit deciding ideal relative positions for the pair of adjacent input regions so that the corresponding overlapping avoidance regions do not overlap, and an ideal position deciding unit calculating the ideal positions so as to minimize a difference between present relative positions of the corresponding overlap avoidance regions and the ideal relative positions.

Furthermore, the ideal relative position deciding unit may be operable when present positions of the overlap avoidance regions corresponding to the pair of input regions do not overlap, to set the present positions of the overlap avoidance regions as the ideal relative positions, and may be operable when the present positions of the overlap avoidance regions corresponding to the pair of input regions overlap, to set positions where one of the overlap avoidance regions has been moved in a direction of a reference line that joins centers of the overlap avoidance regions so as to not overlap another of the overlapping avoidance regions as the ideal relative positions.

Moreover, the size deciding unit may optimize enlargement ratios of the input regions so that all of the input regions fit in a specified area.

The information processing apparatus may further include a prediction unit predicting input information to be inputted by a user. The region control unit may change a display of the input region based on predicted input information that is input information predicted by the prediction unit.

The prediction unit may analyze past input information that has already been inputted from the input regions and predicts an input region to be operated next to input the predicted input information as a next operation region, and the region control unit may change a display of the predicted next operation region.

Moreover, according to another embodiment of the present invention, there is provided an information processing apparatus including a detecting unit detecting an area of an operating body in accordance with a state of the operating body with respect to a surface of a display unit displaying a plurality of input regions operated by the operating body, and a region control unit operable when it has been determined from a detection result of the detecting unit that the area of the operating body is equal to or above a predetermined value, to enlarge one of the input regions that is being indicated by the operating body and to move at least one of the input regions so that adjacent input regions do not overlap one another.

The detection unit may detect a contact area of the operating body based on a pressing force of the operating body on the surface of the display unit. Alternatively, based on approach distances between the operating body and the surface of the display unit, the detection unit may detect the area of the operating body specified from a distribution of the approach distances.

Furthermore, according to another embodiment of the present invention, there is provided an information processing method, including steps of detecting a pressing force applied by an operating body that presses a surface of a display unit displaying a plurality of input regions operated by the operating body, and enlarging the input region being pressed by the operating body and moving at least one of the input regions so that adjacent input regions do not overlap one another when it has been determined from a detection result that the operating body has pressed one of the input regions with a pressing force that is equal to or above a predetermined value.

Moreover, according to another embodiment of the present invention, there is provided an information processing method, including steps of detecting an area of an operating body in accordance with a state of the operating body with respect to a surface of a display unit displaying a plurality of input regions operated by the operating body, and enlarging one of the input regions that is being indicated by the operating body and moving at least one of the input regions so that adjacent input regions do not overlap one another when it has been determined from a detection result that the area of the operating body is equal to or above a predetermined value.

According to another embodiment of the present invention, there is provided a program for causing a computer to function as the information processing apparatus. The program is stored in a storage device included in the computer, and is read and executed by the CPU included in the computer, thereby causing the computer to function as the information processing apparatus. Further, there is also provided a computer readable recording medium in which the program is recorded. The recording medium is a magnetic disc, optical disc, MO (Magneto Optical) disc and the like, for example. Examples of the magnetic disc include a hard disc, a disc-shaped magnetic disc and the like. Further, examples of the optical disc include a CD (Compact Disc), DVD-R (Digital Versatile Disc Recordable), BD (Blu-Ray Disc (registered trademark)) and the like.

According to the embodiments of the present invention, there can be provided an information processing apparatus, information processing method and program capable of smoothly performing key inputting on the on-screen keyboard.

DETAILED DESCRIPTION OF THE EMBODIMENTS

Figure 1:
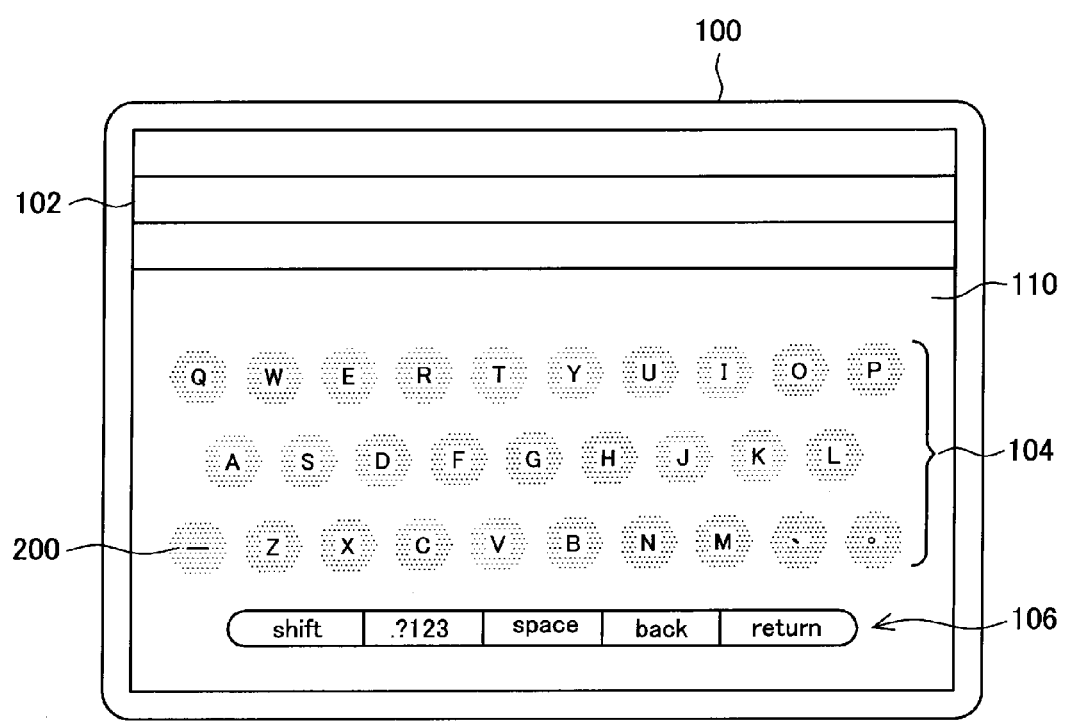
FIG. 1 is a plan view showing a schematic configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.
1. First Embodiment (Approach Detection)
2. Second Embodiment (Pressure Detection)
3. Third Embodiment (Area Detection)

1. First Embodiment

Figure 2:
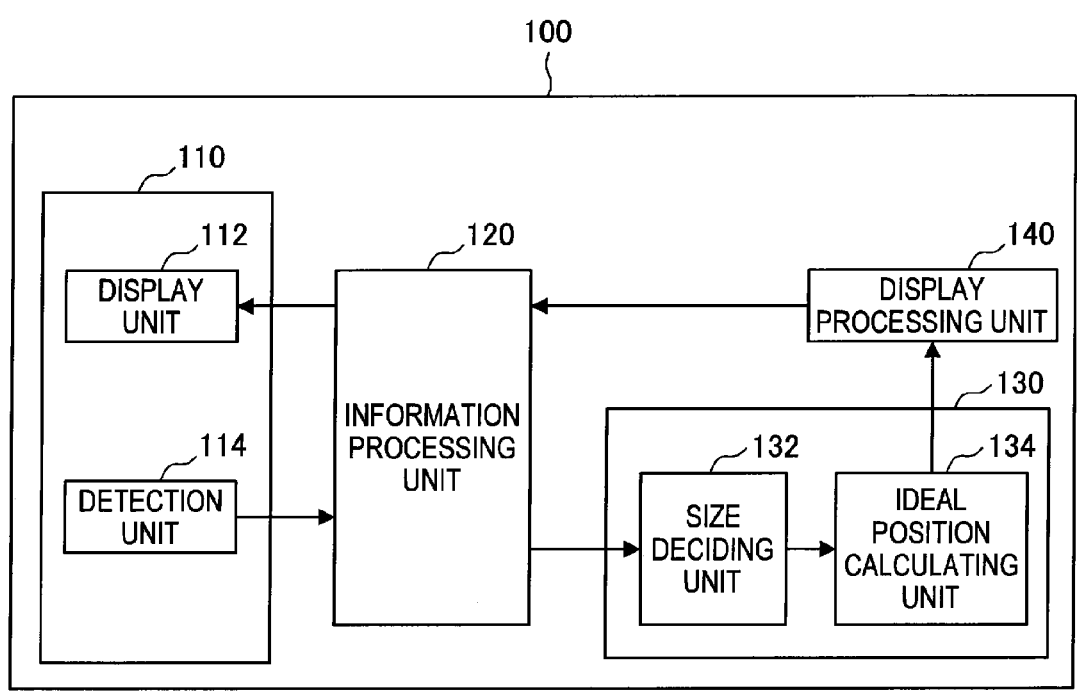
FIG. 2 is a block diagram showing a functional configuration of the information processing apparatus according to the first embodiment.

At first, a schematic configuration of an information processing apparatus 100 according to a first embodiment of the present invention will be described with reference to FIGS. 1 and 2. FIG. 1 is a plan view showing the schematic configuration of the information processing apparatus 100 according to the present embodiment. FIG. 2 is a block diagram showing a functional configuration of the information processing apparatus 100 according to the present embodiment.
Configuration of Information Processing Apparatus The information processing apparatus 100 according to the present embodiment includes a display panel 110 having a touch panel mounted thereon, and is used for ATM in a bank, or portable device such as PDA, cell phone or MP3 player, for example. The display panel 110 according to the present embodiment includes a display unit (reference numeral 112 in FIG. 2) and a detection unit (reference numeral 114 in FIG. 2) for detection an operation on the display unit. The display unit of the display panel 110 displays thereon an input display unit 102 on which input characters are displayed, a key input unit 104 made of several keys for inputting characters such as alphabets or symbols, and a fixed input unit 106 such as input keys or decision key as shown in FIG. 1, for example.

When a user inputs a character from the information processing apparatus 100 including such an on-screen keyboard, the user contacts a key position corresponding to a character to be input by his/her finger or the like. At this time, when a finger's approach or contact to the display unit within a predetermined distance is detected by the detection unit for detecting key inputting, the character is determined to have been input and is displayed on the input display unit 102. The functional configuration of the information processing apparatus 100 according to the present embodiment will be described below in detail.

The information processing apparatus 100 according to the present embodiment includes the display panel 110, an information processing unit 120, a region control unit 130 and a display processing unit 140 as shown in FIG. 2.

The display panel 110 is a function unit which detects an operating body such as user's finger or hand and receives a user's operation, and includes the display unit 112 and the detection unit 114 as described above. The display unit 112 is, for example, a liquid crystal display, and is driven and controlled by the display processing unit 140 through the information processing unit 120. The display unit 112 displays thereon an on-screen keyboard as shown in FIG. 1 or characters input through the keyboard. The detection unit 114 detects an input operation onto the on-screen keyboard displayed on the display unit 112. The display panel 110 according to the present embodiment includes an optical touch sensor for detecting a change in the amount of light (darkness of shadow) to detect an approach of the operating body. At this time, the detection unit 114 can integrally provide one set of three pixels such as red, green and blue as a light reception unit into the display panel 110. The detection unit 114 converts a received light into an electric signal and transmits the electric signal to the information processing unit 120.

The information processing unit 120 is a driver for processing information exchanged between the display panel 110 and the region control unit 130 or the display processing unit 140. The information processing unit 120 calculates an approach position of the operating body based on the electric signal received from the detection unit 114, and transmits the calculated position as approach position information to the region control unit 130. The approach position information is expressed in a three-dimensional coordinate with the center of the display unit 112 as the origin, for example. The information processing unit 120 then determines from the approach position information whether the operating body has approached within a predetermined distance of the surface of the display unit 112. On determining that the operating body has approached within the predetermined distance of the surface of the display unit 112, the information processing unit 120 instructs the region control unit 130 to start executing a focus display processing that changes the sizes of keys. On the other hand, the information processing unit 120 receives display drive information for displaying the changed display contents from the display processing unit 140 to the display unit 112, and transmits it to the display unit 112.

The region control unit 130 calculates a size and a display position of a key to be displayed on the display unit 112 based on the approach position information of the operating body. The region control unit 130 includes a size decision unit 132 and an ideal position calculation unit 134, for example.

The size decision unit 132 decides the size of the input key based on the approach portion information received from the information processing unit 120. In the information processing apparatus 100 according to the present embodiment, the size of an operating body-approaching key and the size of surrounding keys thereof are enlarged than a typically-displayed basic size, thereby preventing the keys from being blocked by the operating body. When deciding the size of the key based on the approach position information, the size decision unit 132 transmits the changed size of the key to the ideal position calculation unit 134.

The ideal position calculation unit 134 performs a processing of avoiding an overlap between the size-changed keys. The ideal position calculation unit 134 decides an overlap avoidance region for avoiding an overlap with other keys in terms of the changed size of the keys. Further, the ideal position calculation unit 134 decides a pair of mutually adjacent keys and decides an ideal relative position where the paired keys do not overlap each other. The ideal position calculation unit 134 minimize a difference between the relative position of the current pair of keys and the ideal relative position, and calculates an ideal position where the overlap between keys is entirely avoided. The ideal position calculation unit 134 transmits position information on the calculated ideal position to the display processing unit 140. The position information on the ideal position can be also expressed in the three-dimensional coordinate with the center of the display unit 112 as the origin, for example.

The display processing unit 140 processes the display drive information for displaying the calculated ideal position on the ideal position calculation unit 134. The display processing unit 140 generates and transmits the display drive information on the display unit 112 for displaying an ideal position to the information processing unit 120. The region control unit 130 and the display processing unit 140 can be configured as an application program for controlling the information processing apparatus 100.

Figure 3:
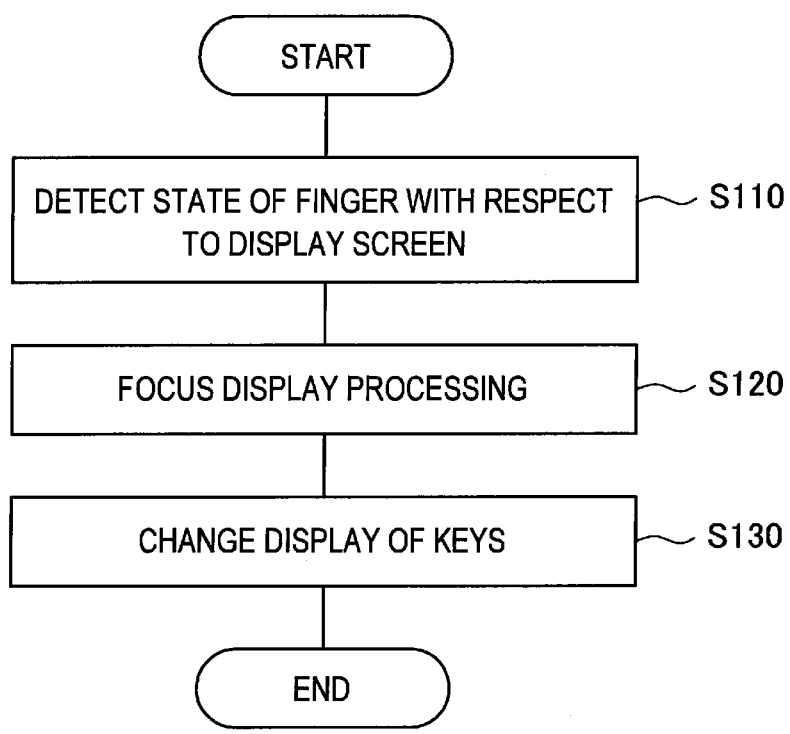
FIG. 3 is a flowchart showing a display processing method of the information processing apparatus according to the first embodiment.
Figure 4:
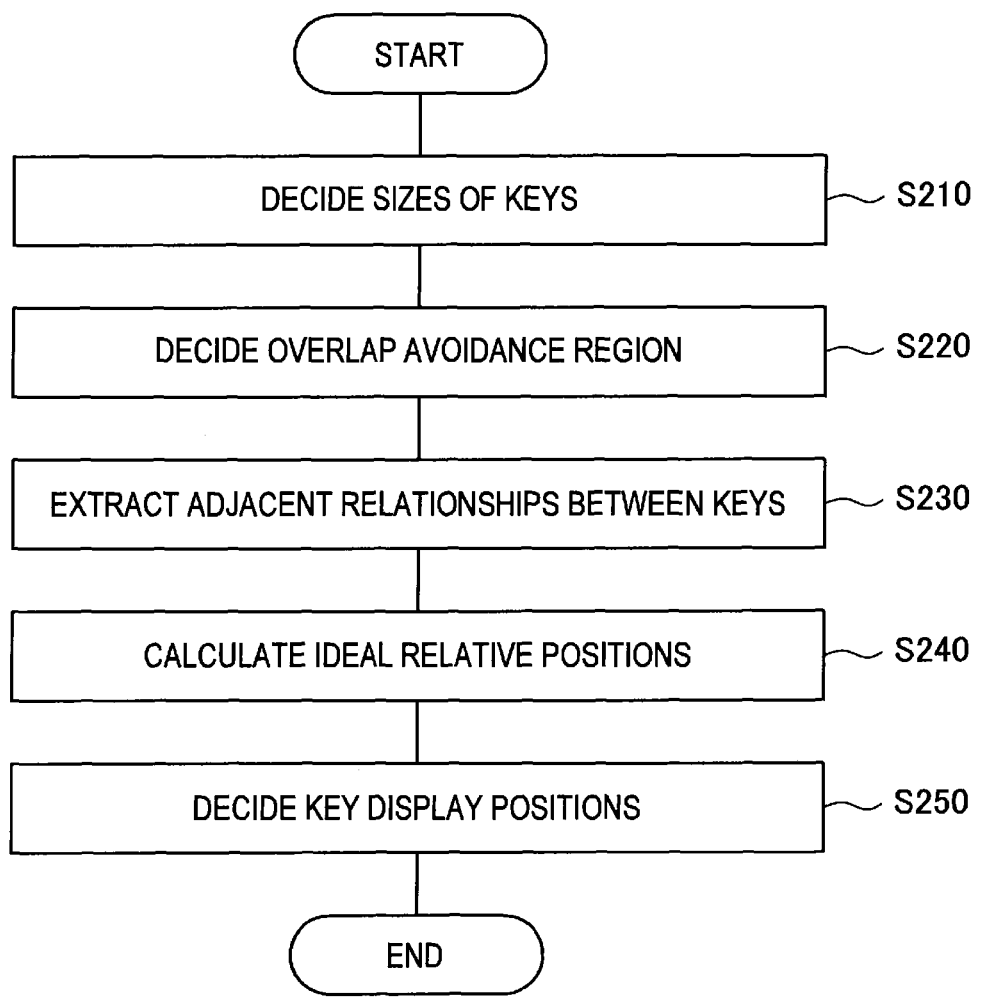
FIG. 4 is a flowchart showing a focus display processing according to the first embodiment.

The configuration of the information processing apparatus 100 according to the present embodiment has been described above. The information processing apparatus 100 enlarges a key corresponding to a character to be input and its surrounding keys in size and changes the key display position to avoid an overlap between enlarged keys in order to make user's key inputting smooth. A display processing method of the information processing apparatus 100 according to the present embodiment will be described below with reference to FIGS. 3 and 4. FIG. 3 is a flowchart showing the display processing method of the information processing apparatus 100 according to the present embodiment. FIG. 4 is a flowchart showing a focus display processing according to the present embodiment.

Key Display Processing Method

At first, the display processing method according to the present embodiment will be described with reference to FIG. 3. In the information processing apparatus 100 according to the present embodiment, by detecting the operating body approaching the surface of the display unit 112 using the detection unit 114 as a state of an operating body such as the user's finger or hand with respect to the surface of the display unit 112, a process that changes the display contents of the key input unit 104 is started (step S110). The detection unit 114 can detect an approach distance of the operating body based on a change in the amount of received light as described above. When the operating body approaches the display unit 112, the amount of light detected by the detection unit 114 provided at the approach position decreases. The detection unit 114 converts the detected amount of light into an electric signal and transmits the signal to the information processing unit 120. The information processing unit 120 specifies a position (approach position) of the key focused by the operating body through the received electric signal.

Next, the information processing unit 120 determines an approach state of an operating body with respect to the display unit 112. When the information processing unit 120 has determined that the operating body has approached within a specified distance of the display unit 112, the region control unit 130 carries out the focus display processing that enlarges the focused key in size and displays the key input unit 104 so that the keys do not overlap (step S120). The focus display processing is performed to change the display contents on the key input unit 104, thereby making user's key inputting smooth and preventing erroneous key touching. The focus display processing will be described below in detail.

When the changed display position is decided by the focus display processing, the key is displayed on the changed display position (step S130). The display processing unit 140 generates the display drive information for changing the display positions of the keys of the key input unit 104, and drives and controls the display unit 112 based on the display drive information.

In this manner, when an approach or contact of the operating body to the display unit 112 is detected, the information processing apparatus 100 according to the present embodiment performs the focus display processing to display a key to be focused in an enlarged manner and to display the key at the position where the overlap between keys is avoided. The focus display processing according to the present embodiment will be described below in detail with reference to FIG. 4.

Focus Display Processing

The focus display processing according to the present embodiment decides the changed size of the key at first as shown in FIG. 4 (step S210). The size decision unit 132 sets a key (focused key) at an operating body-approaching position and its surrounding keys to be larger than the typical basic size. For example, the size of the focused key is set to be about four times the basic size, the size of the surrounding keys is set to be about twice the basic size, and the size of other keys is set at the basic size. In this manner, the size decision unit 132 decides the changed size of the keys. The keys positioned around the focused key can be assumed to be adjacent to the focused key, for example. The key shape may be changed to be similar between before and after the change, or to be different between before and after the change. The position and size of the fixed input unit 106 such as input key or decision key is assumed to be unchanged.

Next, the ideal position calculation unit 134 decides an overlap avoidance region where an overlap between keys is avoided (step S220). The overlap avoidance region is provided for each key as a region where an overlap with other keys is desired to be avoided as much as possible. The overlap avoidance region is decided based on the changed size of the key decided in step S210, for example, and can be assumed as a region including the region of the changed key.

Figure 5:
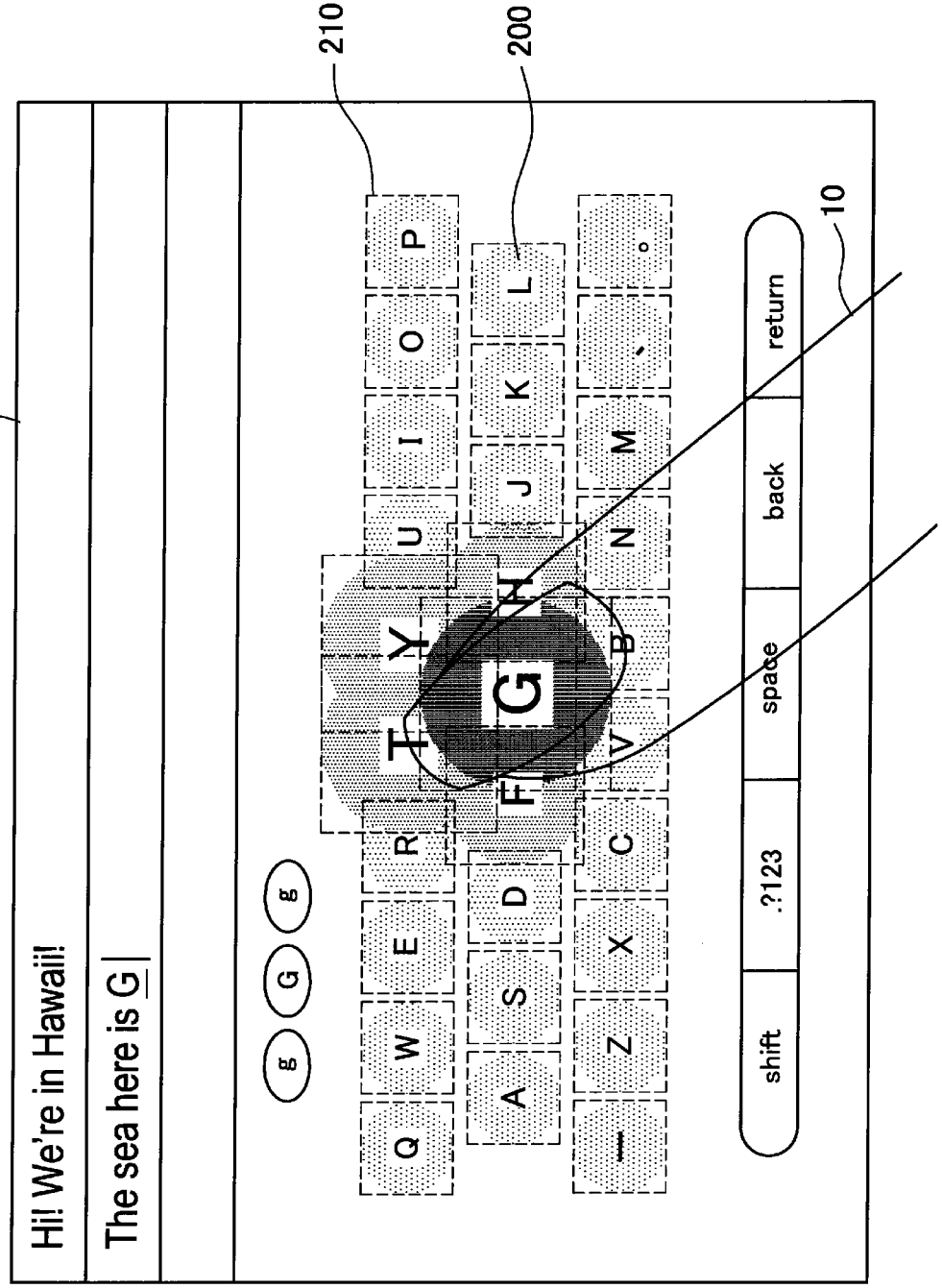
FIG. 5 is an explanatory diagram showing a state of a display panel when a processing in step S210 or S220 is performed.

FIG. 5 shows a state of the display panel 110 when a processing in step S210 or S220 is performed. As shown in FIG. 5, a plurality of substantially circular keys 200 are arranged on the display panel 110. There is assumed such that the user's finger 10 as operating body approaches the display panel 110 and the maximum approach to the alphabet "G" is detected. At this time, the alphabet "G" is set at about four times the basic size, its surrounding keys 200 are set at about twice the basic size and the other keys 200 remain at the basic size.

When the changed size of the keys 200 is decided, the overlap avoidance region 210 of each key 200 is decided. In the example, the overlap avoidance region 210 is set as a minimum rectangle including the regions of the substantially circular keys 200 being changed. The overlap avoidance region 210 may be square or rectangular, or circular.

Figure 6:
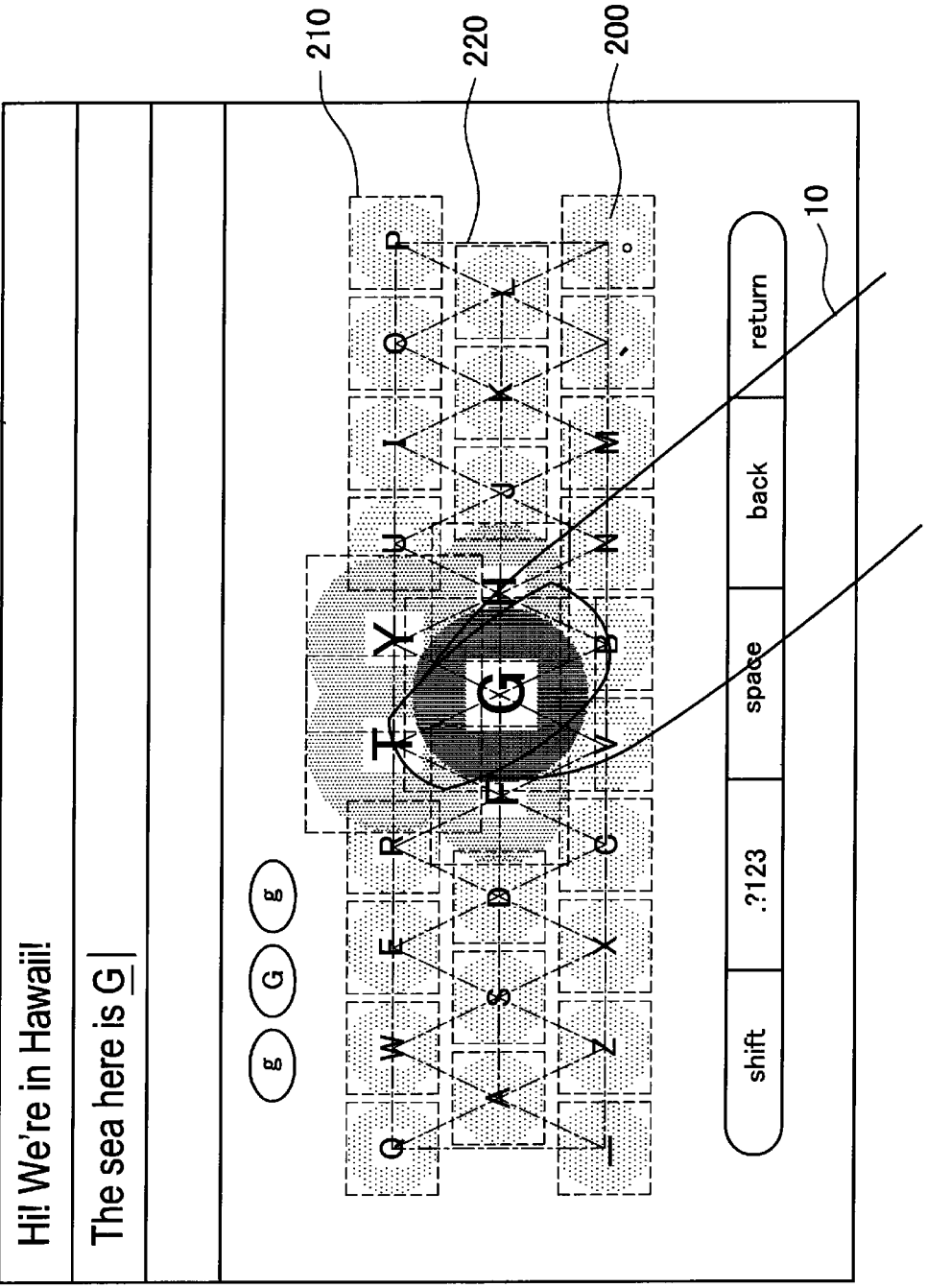
FIG. 6 is an explanatory diagram showing a state of the display panel when a processing in step S230 is performed.

The overlap avoidance processing is performed for displaying the overlap avoidance region 210 of each key not to be overlapped. At first, the information processing unit 120 extracts an approach relationship between keys (step S230). Step S230 is performed as a preprocessing for calculating an ideal relative position for avoiding an overlap between adjacent keys. In the present embodiment, the information processing unit 120 performs Delaunay triangulation with the centers of the overlap avoidance regions 210 as a group of input points, for example, and extracts the approach relationship between keys. The Delaunay triangulation is performed so that a key 200 being approached can be recognized more rapidly. A Delaunay side 220 defined by the processing is as shown in FIG. 6.

Figure 7:
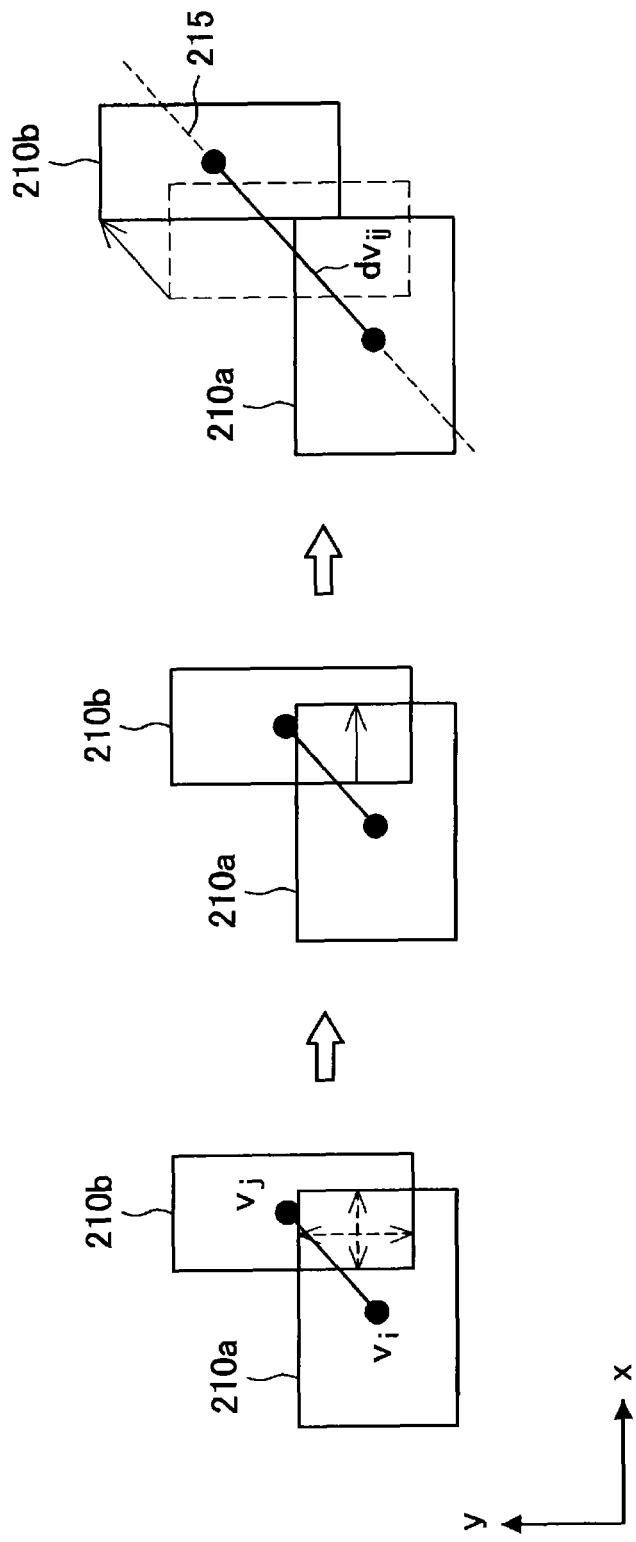
FIG. 7 is an explanatory diagram showing one example of an ideal relative position calculation method.

Next, the ideal relative position is calculated (step S240). In step S240, in a pair of overlap avoidance regions connected by the Delaunay sides 220 calculated in step S230, an ideal relative position where the overlap is not present is calculated. One example of the ideal relative position calculation method will be described with reference to FIG. 7. FIG. 7 is an explanatory diagram showing one example of the ideal relative position calculation method, where only one pair of overlap avoidance regions 210a and 210b is illustrated for convenient explanation.

The left diagram in FIG. 7 shows the overlap avoidance regions 210a and 210b at present (before changing the display region). The center position of the overlap avoidance region 210a is assumed as v, and the center position of the overlap avoidance region 210b is assumed as $v_j$. When the overlap avoidance regions 210a and 210b overlap each other, the center positions $v_i$ and $v_j$ of the overlap avoidance regions 210a and 210b are connected to decide a reference line 215. Next, as illustrated in the center diagram in FIG. 7, one overlap avoidance region (the overlap avoidance region 210b in FIG. 7) is moved in parallel along with the reference line 215 until an overlap with the other overlap avoidance region (the overlap avoidance region 210a in FIG. 7) is eliminated. Thus, the positions of the keys 200 can be changed without changing the relative direction of adjacent keys 200.

Then, a position where the overlap between the two overlap avoidance regions 210a and 210b is eliminated, which is illustrated in the right diagram in FIG. 7, can be assumed as the ideal relative position. The length of the overlapped portion in the xy direction may be set such that each overlap avoidance region 210a, 210b can move at the shortest distance. On the other hand, when the overlap avoidance regions 210a and 210b do not overlap each other, the present position may be assumed as the ideal relative position.

When the ideal relative position is calculated, a difference between the present relative position and the ideal relative position is minimized. The minimizing processing may employ the least square method, for example. At this time, the center of the screen is assumed as the center of gravity of the entire overlap avoidance regions 210, thereby fixing the display region. The processing of minimizing the difference between the present relative position and the ideal relative position can be performed by the following Formula 1:

$$v_{i_{new}} = \mathrm{argmin}\left\{ \sum_{i,j} |(V_i - v_j) - dv_{ij}|^2 + \left|\left(\frac{1}{n}\sum_i v_i\right) - c\right|^2 \right\} \quad \text{[Formula 1]}$$

where $v_i$ and $v_j$ are the respective center positions of a pair of overlap avoidance regions 210 and correspond to the start point and the end point of the Delaunay side, respectively. $dv_{ij}$ denotes an ideal relative position of $v_i$ relative to $v_j$. n denotes the number of apexes constituting the Delaunay side, that is the number of overlap avoidance regions. c is the center of gravity of the entire overlap avoidance regions and in the present embodiment is the center coordinate of the screen of the display unit 112. In this manner, each position of $v_i$ for minimizing the calculated value is calculated by Formula 1. In the present embodiment, the processing in Formula 1 is performed only once for speeding up the processing, which does not ensure that the keys do not completely overlap each other. Thus, in order to completely eliminate an overlap between keys, the processing may be performed several times, thereby enhancing the accuracy of the changed position.

Then, the ideal position $v_{inew}$ to which each overlap avoidance region 210 is moved is decided and displayed on the display panel 110 (step S250). In this manner, the focus display processing according to the present embodiment is performed so that a key near a user's finger is enlarged to be displayed but the surrounding keys of the key to be enlarged enlarge their key size while moving in parallel to avoid an overlap. Then, a key away from the finger may hold its basic position and basic size.

Figure 8:
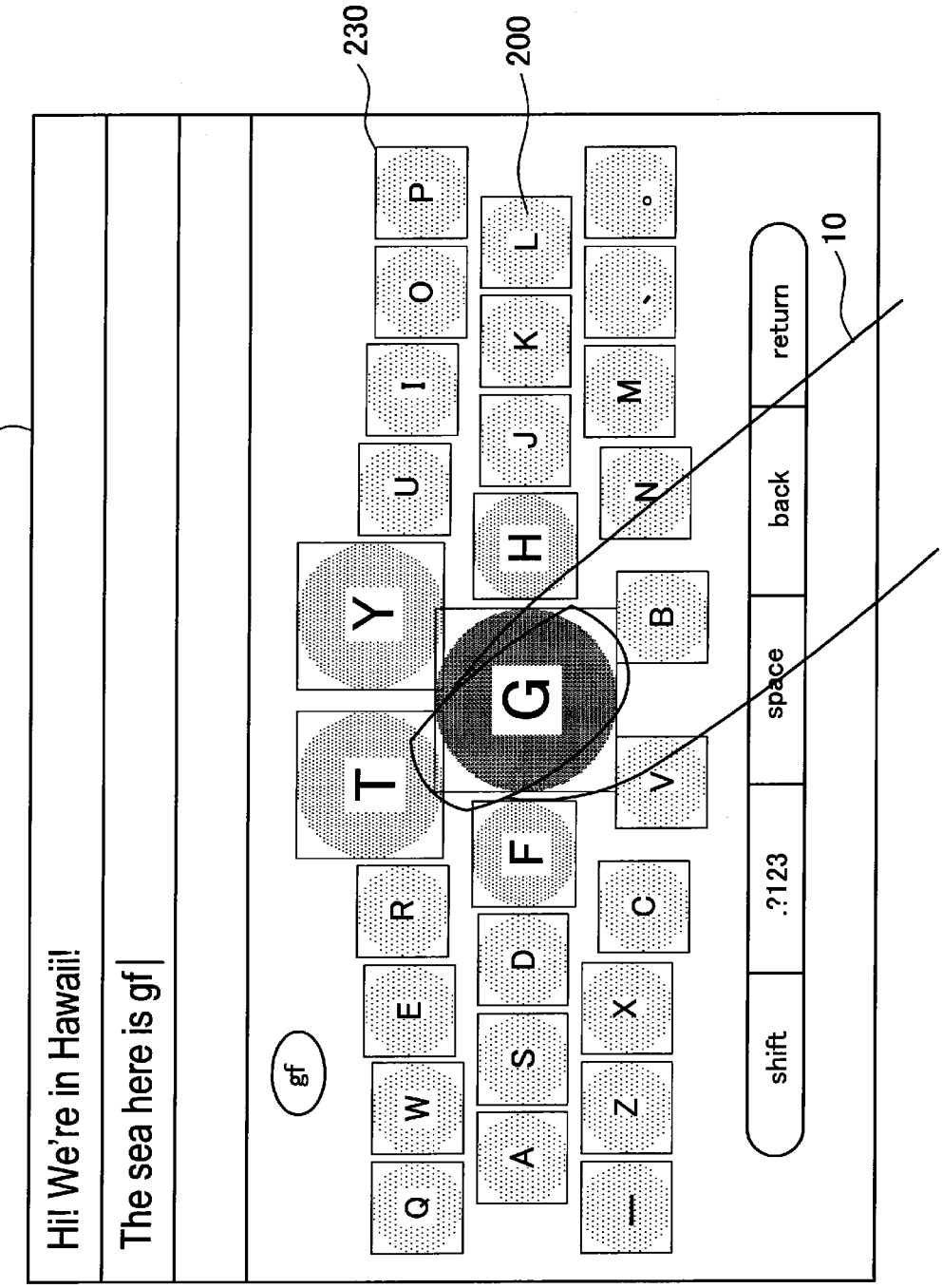
FIG. 8 is an explanatory diagram showing a state of the display panel when a processing in step S240 is performed.

FIG. 8 shows a state of the display panel 110 when a processing in step S240 is performed. As shown in FIG. 8, in the ideal position 230 which is a position in the overlap avoidance region of the changed key calculated by Formula 1, the focused key is enlarged as compared with in the present position of the overlap avoidance region 210 and its surrounding keys take positions away from the enlarged key.

Figure 9:
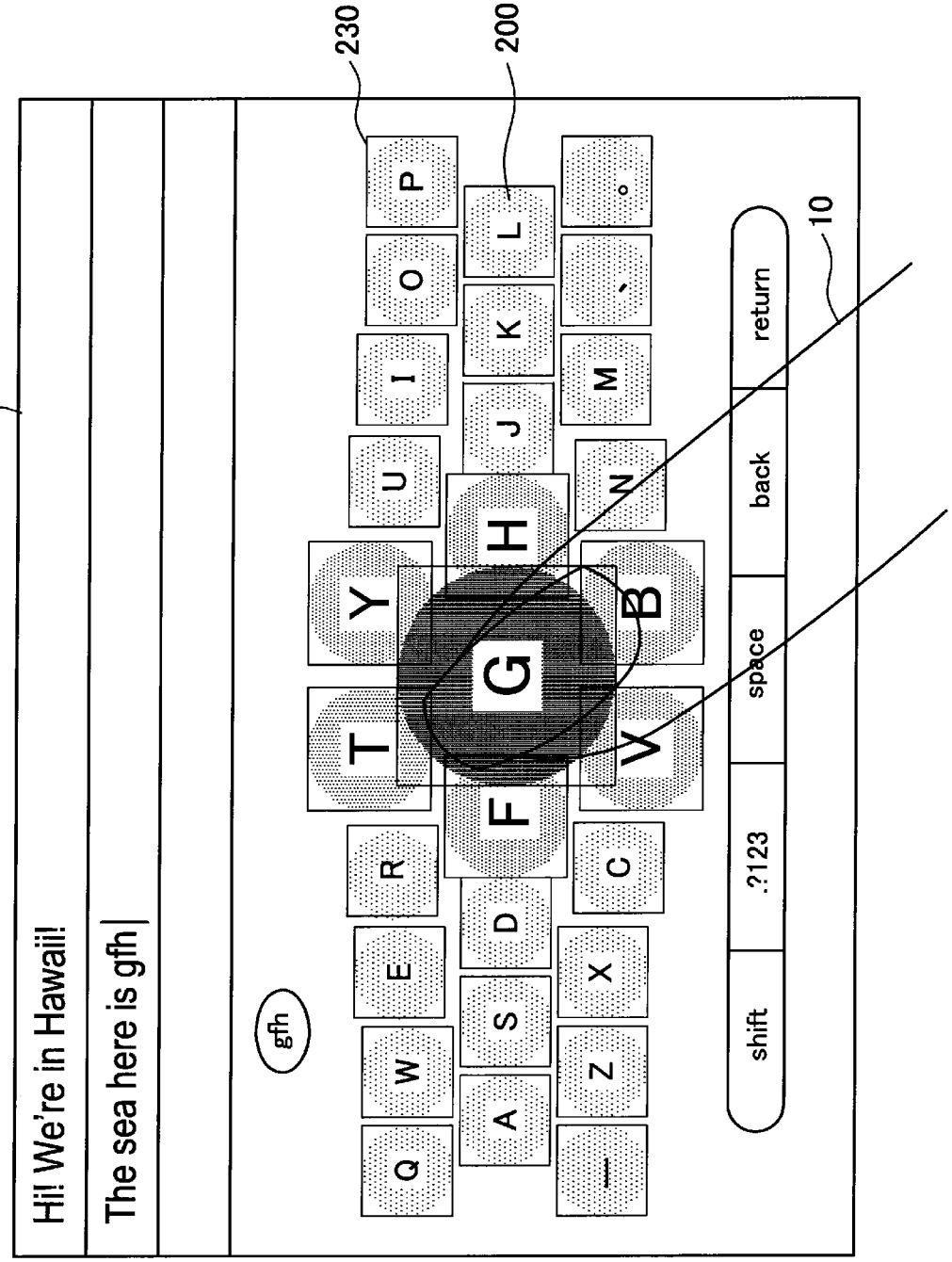
FIG. 9 is an explanatory diagram showing one example of a size and arrangement of keys when a focus display processing according to the first embodiment is performed.

Thereafter, when the user's finger 10 further approaches and contacts the display panel 110 from the position shown in FIG. 8, the size of the focused alphabet "G" key is further enlarged as compared with before the contact of the user's finger 10 as shown in FIG. 9, for example. At this time, the surrounding keys of the alphabet "G" key are made smaller as compared with FIG. 8. Thus, the key through which the user inputs is easier to input, thereby preventing erroneous touching of other keys.

Figure 10:
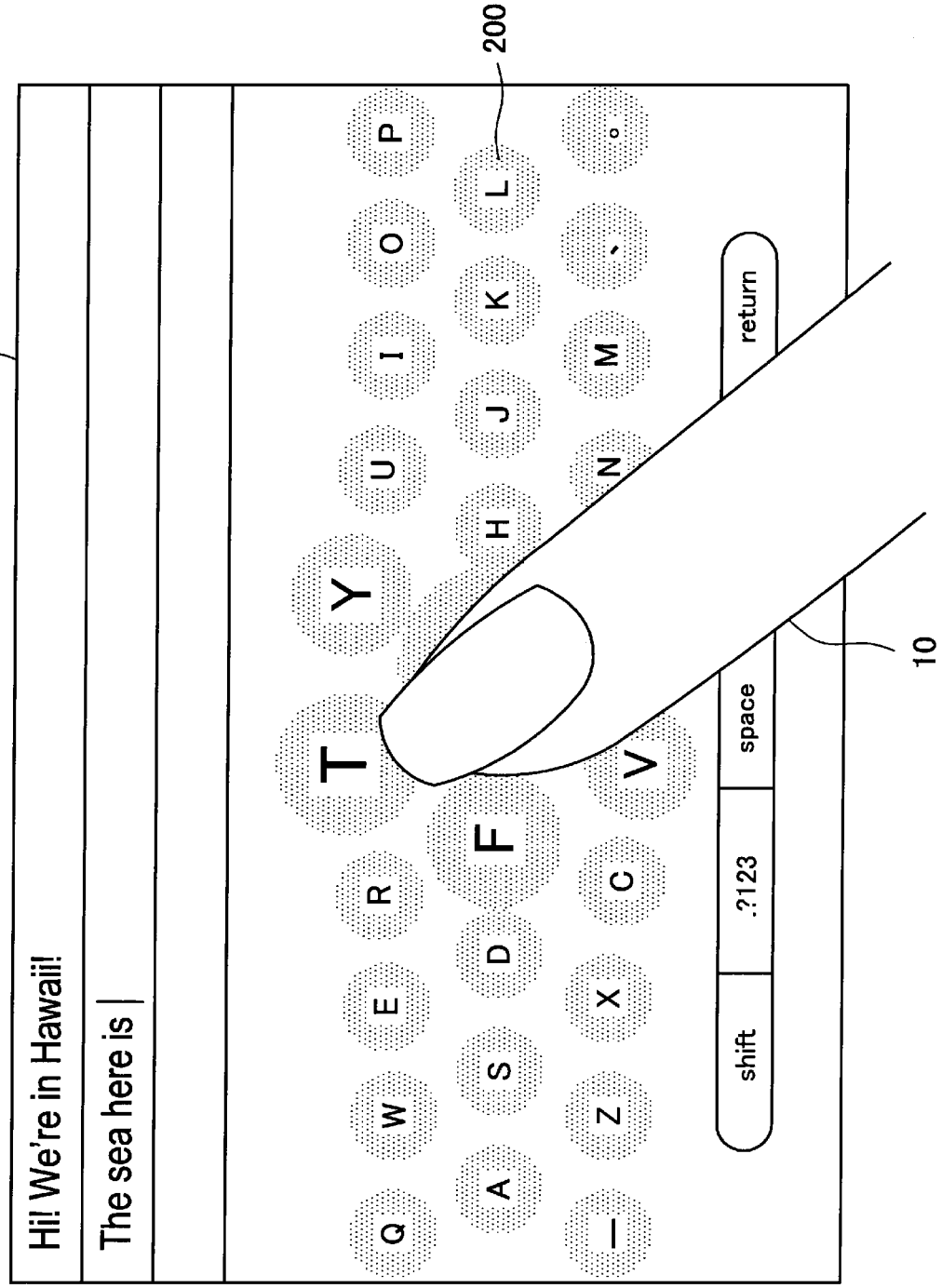
FIG. 10 is an explanatory diagram showing another example of the size and arrangement of the keys when the focus display processing according to the first embodiment is performed.

There is assumed that the user moves the finger 10 to the alphabet "T" while contacting the finger 10 on the display panel 110. At this time, the information processing apparatus 100 can detect the direction of the finger 10 as the operating body by the detection unit 114 of the display panel 110 and enlarge the key size of a key having a high possibility of being touched. For example, the information processing apparatus 100 enlarges the size of the alphabets "T", "F" and "Y" positioned in the finger-moving direction as shown in FIG. 10 as compared with the state of FIG. 9. The key size of the alphabets "B", "V" and "H" positioned opposite to the finger moving direction and the key size of the alphabet "G" on which the finger 10 is placed are reduced as compared with the state of FIG. 9. Thus, the keys having a high possibility of being touched by the user are easier to touch while the keys having a low possibility of being touched are prevented from being erroneously operated.

The information processing apparatus 100 according to the first embodiment and the key display processing method using the same have been described above. According to the present embodiment, a focused key and its surrounding keys on the display unit 112 which the operating body approaches or contacts are enlarged in the display size and each key is displayed at the position where an overlap between keys is avoided. Thus, user's key inputting can be performed smoothly.

In step S210, an enlargement factor of individual key may be optimized such that the entire area of the key input unit 104 is not changed. For example, the keys away from the focused key are displayed to be smaller than the basic size so that the keys 200 of the key input unit 104 are adjusted to be within a predetermined display region. Thus, also when the number of keys to be enlarged through multipoint input is increased, the entire key input unit 104 can be displayed not to be offset from the display region on the display panel 110.

Information Processing Apparatus Equipped with Prediction Unit

Figure 11:
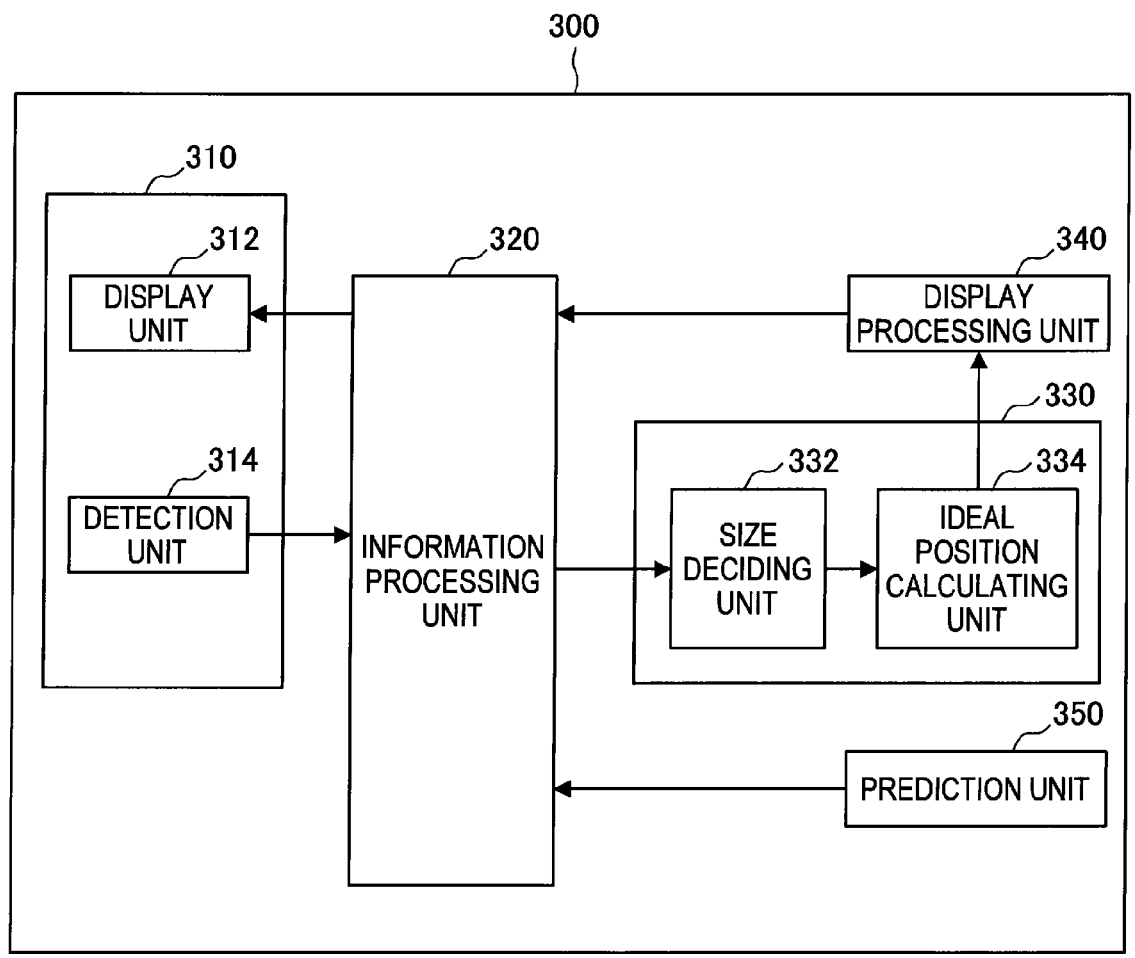
FIG. 11 is a block diagram showing the functional configuration of an information processing apparatus that is a modification of the information processing apparatus according to the same embodiment.

Next, as a modification of the information processing apparatus 100 according to the present embodiment, an information processing apparatus 300 equipped with a prediction unit will be described with reference to FIG. 11. The information processing apparatus 300 according to the present embodiment is different from the information processing apparatus 100 according to the first embodiment in that it includes a prediction unit 350 for predicting input information. The configuration and processing of the information processing apparatus 300 according to the present embodiment will be described mainly based on the difference with the information processing apparatus 100 with reference to FIG. 11. FIG. 11 is a block diagram showing a functional configuration of the information processing apparatus 300 according to the present embodiment.

Configuration of Information Processing Apparatus

The information processing apparatus 300 according to the present embodiment includes a display panel 310 having a display unit 312 and a detection unit 314, an information processing unit 320, a region control unit 330 having a size decision unit 332 and an ideal position calculation unit 334, a display processing unit 340 and the prediction unit 350 as shown in FIG. 11. The display panel 310, the information processing unit 320, the region control unit 330 and the display processing unit 340 have the similar functions and configurations to those of the display panel 110, the information processing unit 120, the region control unit 130 and the display processing unit 140 according to the information processing apparatus 100, respectively. Thus, the explanation thereof will be omitted.

The prediction unit 350 is a function unit for predicting input information to be input by the user. When an approach or contact of the operating body to the display panel 310 is detected by the detection unit 314, the prediction unit 350 predicts a word to be input from the already-input characters, and automatically generates one or several candidate character strings (predictive input information). Then, the prediction unit 350 analyzes the readings of the candidate character strings and transmits the analysis result via the information processing unit 320 to the region control unit 330.

Application to Predictive Conversion Function

The information processing apparatus 300 according to the present embodiment can predict a word to be input by the prediction unit 350 from a character to be input by the user. The predictive conversion processing can be performed by using an existing method. The prediction unit 350 further analyzes a reading of a predicted word and obtains a character to be input next for each candidate character string. The character to be input next is directed for narrowing the candidate character strings. The prediction unit 350 transmits the obtained character via the information processing unit 320 to the region control unit 330.

The region control unit 330 which has received the candidates of the character to be input next decides the changed size of the key by the size decision unit 332 at first. For example, the key size of the character to be input next is enlarged than the basic size and the size of other characters remain at the basic size. Then, the ideal position calculation unit 334 decides an overlap avoidance region where an overlap between keys is avoided. The overlap avoidance region can be decided based on the changed size of the key decided by the size decision unit 332, and can be assumed as a region including a region of the changed key, for example.

Further, in order to display an overlap avoidance region of each key in a non-overlapped manner, after the approach relationship between keys is extracted, the ideal relative position is calculated. When a pair of overlap avoidance regions is decided from the approach relationship between keys, the ideal relative position where the two overlap avoidance regions do not overlap each other is calculated for each pair. The processing can be performed similarly to the information processing apparatus 100. When the ideal relative position is calculated, the above Formula 1 is used, for example, to minimize the difference between the present relative position and the ideal relative position. The position (ideal position) of each moved key can be calculated in this manner.

As described above, the focus display processing is applied to the predictive conversion function so that the key of a character to be input next for a candidate character string is displayed in an enlarged manner and its surrounding keys are displayed at the basic size. The surrounding keys are displayed not to overlap the key to be touched next. Thus, the key to be touched next by the user is easy to touch, and the candidate character strings can be smoothly narrowed.

The information processing apparatus 300 according to the present embodiment performs the enlargement of keys and the avoidance of overlap to make key inputting smooth but can induce the key to be touched next to the user by a difference in color between the key to be touched next and other keys. Further, the information processing apparatus 300 displays one or several candidate character strings of the predicted word on the display unit 312 of the key display panel 310 so that the user can select the candidate character string.

2. Second Embodiment

Next, an information processing apparatus according to a second embodiment of the present invention will be described. Compared to the information processing apparatus 100 according to the first embodiment, the information processing apparatus according to the present embodiment differs in that the focused key is determined and processing is carried out based on a force applied by the operating body to the display unit 112. That is, although the overall configuration of the information processing apparatus 100 is the same as in FIG. 2, the detection unit 114 in FIG. 2 detects a pressing force applied by the operating body pressing the display unit 112 and the information processing unit 120 carries out processing based on the detected pressing force. The information processing apparatus according to the present embodiment and processing by such information processing apparatus will now be described focusing on the differences with the information processing apparatus 100 according to the first embodiment. Note that since the overall configuration and processing content of the information processing apparatus are substantially the same as in the first embodiment, the following description also refers to FIGS. 1 to 11.

Configuration of Information Processing Apparatus

As shown in FIG. 2, the information processing apparatus 100 according to the present embodiment includes the display panel 110 equipped with the display unit 112 and the detection unit 114, the information processing unit 120, the region control unit 130, and the display processing unit 140. As mentioned above, the processing by the detection unit 114 of the display panel 110 and the information processing unit 120 differs to the first embodiment.

The detection unit 114 detects a pressing force applied by an operating body such as the user's finger that presses the surface of the display unit 112. As one example, it is possible to use a resistive touch panel as the detection unit 114. A resistive touch panel is constructed by layering members such as films or pieces of glass provided with transparent conductive films (ITO; Indium Tin Oxide) where electrodes are arranged in a grid, so that the transparent conductive films face one another with a spacer in between. With a resistive touch panel, it is possible to detect an operating body pressing the surface of the touch panel from a change in the current distribution due to the transparent conductive films touching when the operating body presses the surface. Based on the positions of the electrodes through which current flows when the panel is pressed, it is possible to specify the position where the operating body is contacting the display unit 112. The detection unit 114 outputs a value of the pressing force and the pressed position, which have been detected due to the operating body pressing the surface of the display unit 112, to the information processing unit 120.

The information processing unit 120 determines whether it may be necessary to execute a focus display processing based on the pressing force and pressed position inputted from the detection unit 114. The information processing unit 120 first calculates the contact position information of the operating body. As one example, the contact position information is expressed by three-dimensional coordinates with the center of the display unit 112 as the origin. More specifically, the contact position information is expressed using the position (two-dimensional coordinates) of the operating body on the surface of the display unit 112 detected by the detection unit 114 and a pressing depth of the operating body on the display unit 112 calculated from the value of the pressing force. The pressing depth is a value expressing the pressing strength of the operating body on the display unit 112, and the larger the value of the pressing depth, the stronger the display unit 112 is being pressed. The information processing unit 120 calculates the contact position information expressed by three-dimensional coordinates with the pressing depth as the size in a direction perpendicular to the surface of the display unit 112.

When the pressing force is equal to or above a predetermined value, that is, when the pressing depth is equal to or above a predetermined value, the information processing unit 120 decides to execute the focus display processing. As one example, it is possible to set determination that the operating body has contacted the display unit 112 as a condition for starting the focus display processing. In this case, the predetermined value may be set at a pressing depth when an operating body has pressed the display unit 112. When execution of the focus display processing has been decided, the information processing unit 120 outputs the contact position information composed of the pressed position and the pressing depth of the operating body on the display unit 112 to the region control unit 130. On the other hand, the information processing unit 120 receives display drive information for displaying the changed display contents from the display processing unit 140 to the display unit 112, and transmits it to the display unit 112.

The region control unit 130 calculates a size and a display position of a key to be displayed on the display unit 112 based on the approach position information of the operating body. The region control unit 130 includes a size decision unit 132 and an ideal position calculation unit 134, for example.

The size decision unit 132 decides the size of the input key based on the approach position information received from the information processing unit 120. In the information processing apparatus 100 according to the present embodiment, the size of an operating body-approaching key and the size of surrounding keys thereof are enlarged than a typically-displayed basic size, thereby preventing the keys from being blocked by the operating body. When deciding the size of the key based on the approach position information, the size decision unit 132 transmits the changed size of the key to the ideal position calculation unit 134.

The ideal position calculation unit 134 performs a processing of avoiding an overlap between the size-changed keys. The ideal position calculation unit 134 decides an overlap avoidance region for avoiding an overlap with other keys in terms of the changed size of the keys. Further, the ideal position calculation unit 134 decides a pair of mutually adjacent keys and decides an ideal relative position where the paired keys do not overlap each other. The ideal position calculation unit 134 minimize a difference between the relative position of the current pair of keys and the ideal relative position, and calculates an ideal position where the overlap between keys is entirely avoided. The ideal position calculation unit 134 transmits position information on the calculated ideal position to the display processing unit 140. The position information on the ideal position can be also expressed in the three-dimensional coordinate with the center of the display unit 112 as the origin, for example.

The display processing unit 140 processes the display drive information for displaying the calculated ideal position on the ideal position calculation unit 134. The display processing unit 140 generates and transmits the display drive information on the display unit 112 for displaying an ideal position to the information processing unit 120. The region control unit 130 and the display processing unit 140 can be configured as an application program for controlling the information processing apparatus 100.

Display Processing Method for Keys

In the information processing apparatus 100 according to the present embodiment, the contact position of the operating body on the display unit 112 is specified based on the detection result produced by the detection unit 114 that detects the pressing force of the operating body and the contact position is set as the position of a key placed in focus by the operating body. To enable the user to make a key input smoothly, the information processing apparatus 100 enlarges the sizes of the key corresponding to the character to be inputted and keys in the periphery and also changes the display positions of the keys so that overlapping of the enlarged keys is avoided.

As shown in FIG. 3, first, as the state of the operating body on the surface of the display unit 112, the information processing apparatus 100 detects a pressing state of the operating body on the display unit 112 using the detection unit 114 and starts a process that changes the display contents of the key input unit 104 (step S110). The detection unit 114 is capable of detecting the pressing state of the operating body based on changes in the current distribution of the electrodes. When the operating body presses the display unit 112, the current distribution of the electrodes changes. The detection unit 114 monitors such changes and outputs a detection result to the information processing unit 120.

Based on the detection result, the information processing unit 120 calculates the contact position information and determines whether the operating body is contacting the display unit 112. This determination can be made by judging whether the value of the pressing force, that is, the pressing frequency, calculated from the current distribution of the electrodes is equal to or above a specified value. When the pressing force is equal to or above the specified value, the information processing unit 120 determines that the operating body is contacting the surface of the display unit 112. On determining that the operating body is contacting the surface of the display unit 112, the information processing unit 120 then outputs the contact position information of the operating body on the display unit 112 as the position of the focused key to the region control unit 130.

Next, when the information processing unit 120 has determined that the operating body is contacting the display unit 112, the region control unit 130 carries out the focus display processing that enlarges the specified focused key and displays the key input unit 104 so that the keys do not overlap one another (step S120). The focus display processing is performed to change the display contents of the key input unit 104, thereby enabling the user to make a key input smoothly and preventing erroneous key touching. The focus display processing is performed to change the display contents on the key input unit 104, thereby making user's key inputting smooth and preventing erroneous key touching. The focus display processing will be described below in detail. Note that the focus display processing may be carried out according to the method described in the first embodiment.

When the changed display position is decided by the focus display processing, the key is displayed on the changed display position (step S130). The display processing unit 140 generates the display drive information for changing the display positions of the keys of the key input unit 104, and drives and controls the display unit 112 based on the display drive information. When changed display positions have been decided by the focus display processing, the keys are displayed at the changed display positions (step S130). The display processing unit 140 generates display drive information for changing the display positions of the keys of the key input unit 104, and drives and controls the display unit 112 based on the display drive information. In this way, when contact of the operating body on the display unit 112 is detected, the information processing apparatus 100 according to the present embodiment carries out the focus display processing that enlarges and displays the key in focus and displays the keys at positions where overlapping of the keys is avoided.

Note that although it is determined in the present embodiment whether it may be necessary to execute the focus display processing in accordance with whether the operating body has contacted the display unit 112, the present invention is not limited to this example. As one example, the information processing apparatus 100 may execute the focus display processing when the pressing depth of the operating body is equal to or above a value corresponding to when the operating body presses the display unit 112 with a specified pressing force. Also, in the same way as the first embodiment described above, the present embodiment may include a prediction unit (see FIG. 11) that predicts input information to be inputted by the user.

This completes the description of the information processing apparatus 100 according to the second embodiment and the display processing method for keys used by such apparatus. According to the present embodiment, the display sizes of the focus key pressed on the display unit 112 by an operating body and keys in the periphery thereof are enlarged, and the keys are displayed at positions that have been moved to avoid overlapping of the keys. By doing so, it is possible for the user to make a key input smoothly.

3. Third Embodiment

Next, an information processing apparatus according to a third embodiment of the present invention will be described. Compared to the information processing apparatus 100 according to the first embodiment, the information processing apparatus according to the present embodiment differs in that the key in focus is determined and processing is carried out based on the area of the operating body. The information processing apparatus according to the present embodiment and the processing by such information processing apparatus will now be described focusing on the differences with the information processing apparatus 100 according to the first embodiment. Note that since the overall configuration and processing content of the information processing apparatus are substantially the same as in the first embodiment, the following description also refers to FIGS. 1 to 11.

Configuration of Information Processing Apparatus

As shown in FIG. 2, the information processing apparatus 100 according to the present embodiment includes the display panel 110 equipped with the display unit 112 and the detection unit 114, the information processing unit 120, the region control unit 130, and the display processing unit 140. The detection unit 114 of the information processing apparatus 100 according to the present embodiment detects the area of the operating body in accordance with the state of the operating body with respect to the surface of the display unit 112.

As examples, the expression "the state of the operating body with respect to the surface of the display unit 112" detected by the detection unit 114 may refer to the "approach distance", i.e., the distance from the operating body to the surface of the display unit 112 and/or a pressing force applied by the operating body to the surface of the display unit 112. As examples, it is possible to detect the approach distance and/or the pressing force using the devices and the like described in the first or second embodiment. From detection values of the approach distance, the pressing force, and the like, the detection unit 114 then expresses the state of the surface of the display unit 112 and the operating body as the area of the operating body.

For example, when it is possible for the detection unit 114 to detect the approach distance, a group of positions (points) where the operating body has approached within a predetermined distance from the surface of the display unit 112 can be set as the area of the operating body. Here, the larger the part of the operating body that has approached the surface of the display unit 112, the larger the "area" of the operating body. Also, when the detection unit 114 is capable of detecting the pressing force for example, a group of positions (points) where a pressing force that is equal to or above a predetermined value is detected due to the operating body pressing the display unit 112 can be set as the area of the operating body. In this case, the larger the contact area of the surface of the display unit 112 and the operating body, and the larger the pressing force, the larger the area of the operating body. Alternatively, when it is possible for the detection unit 114 to detect that the operating body has contacted the surface of the display unit 112 for example, the part of the operating body that contacts the display unit 112 can be set as the area of the operating body.

The area of the operating body may be expressed as a number of detection positions that are counted as an area part out of a plurality of detection positions on the display unit 112 or may be the area of a region decided by interpolating the detection positions. The detection unit 114 outputs the area of the operating body calculated from the state of the operating body with respect to the surface of the display unit 112 to the information processing unit 120.

The information processing unit 120 calculates position information of the operating body on the display unit 112 based on the area of the operating body inputted from the detection unit 114 and determines whether it may be necessary to execute the focus display processing. The position information of the operating body can be expressed by three-dimensional coordinates with the center of the display unit 112 as the origin. As examples, the position (two-dimensional coordinates) of the operating body with respect to the display unit 112 can be expressed by a center position of the key with the largest part included in the area of the operating body out of a plurality of keys, or a center of gravity position for the area of the operating body. Such positions can be calculated using an existing method. The position of the operating body in a direction perpendicular to the surface of the display unit 112 can be calculated using the method in the first and second embodiments described above, or an existing method.

When, for example, the detected area of the operating body is equal to or larger than a specified size, the information processing unit 120 infers that a state where the operating body has approached or is contacting the display unit 112 has been reached and determines to execute the focus display processing. On deciding to execute the focus display processing, the information processing unit 120 then outputs position information of the operating body calculated based on the area of the operating body to the region control unit 130. On the other hand, the information processing unit 120 receives display drive information for displaying the changed display contents from the display processing unit 140 to the display unit 112, and transmits it to the display unit 112.

The region control unit 130 calculates a size and a display position of a key to be displayed on the display unit 112 based on the position information of the operating body. The region control unit 130 includes a size decision unit 132 and an ideal position calculation unit 134, for example.

The size decision unit 132 decides the size of the input key based on the position information received from the information processing unit 120. In the information processing apparatus 100 according to the present embodiment, the size of an operating body-approaching key and the size of surrounding keys thereof are enlarged than a typically-displayed basic size, thereby preventing the keys from being blocked by the operating body. When deciding the size of the key based on the approach position information, the size decision unit 132 transmits the changed size of the key to the ideal position calculation unit 134.

The ideal position calculation unit 134 performs a processing of avoiding an overlap between the size-changed keys. The ideal position calculation unit 134 decides an overlap avoidance region for avoiding an overlap with other keys in terms of the changed size of the keys, decides a pair of mutually adjacent keys and decides an ideal relative position where the paired keys do not overlap each other. The ideal position calculation unit 134 minimize a difference between the relative position of the current pair of keys and the ideal relative position, and calculates an ideal position where the overlap between keys is entirely avoided. The ideal position calculation unit 134 transmits position information on the calculated ideal position to the display processing unit 140. The position information on the ideal position can be also expressed in the three-dimensional coordinate with the center of the display unit 112 as the origin, for example.

The display processing unit 140 processes the display drive information for displaying the calculated ideal position on the ideal position calculation unit 134. The display processing unit 140 generates and transmits the display drive information on the display unit 112 for displaying an ideal position to the information processing unit 120. The region control unit 130 and the display processing unit 140 can be configured as an application program for controlling the information processing apparatus 100.

Display Processing Method for Keys

In the information processing apparatus 100 according to the present embodiment, based on the detection result of the detection unit 114 that detects the pressing force of the operating body, the position of the operating body with respect to the display unit 112 is specified and the specified position of the operating body is set as the position of the key placed in focus by the operating body. After this, to enable the user to make a key input smoothly, the information processing apparatus 100 enlarges the sizes of the key corresponding to the character to be inputted and keys in the periphery and changes the display positions of the keys so that overlapping of the enlarged keys is avoided.

As shown in FIG. 3, first, the information processing apparatus 100 detects the state of the operating body with respect to the surface of the display unit 112 using the detection unit 114 and starts the process that changes the display contents of the key input unit 104 (step S110). The detection unit 114 is capable of detecting the state of the operating body as the area of the operating body. If the operating body has approached or contacted the display unit 112, the area of the operating body detected by the detection unit 114 changes. The detection unit 114 monitors the state of such changes and outputs a detection result to the information processing unit 120.

From the detection result, the information processing unit 120 calculates the position information of the operating body and determines whether the area of the operating body is equal to or above a predetermined value. When it has been determined that the area of the operating body is equal to or above the predetermined value, the information processing unit 120 infers that the operating body has approached or contacted the display unit 112 and instructs the region control unit 130 to execute the focus display processing that changes the layout of the keys. Here, the information processing unit 120 specifies the position of the operating body with respect to the display unit 112 and notifies the region control unit 130 of the position of the focused key.

Next, when the information processing unit 120 has determined that the area of the operating body is equal to or above the predetermined value, the region control unit 130 carries out the focus display processing to enlarge the focused key specified by the information processing unit 120 and display the key input unit 104 so that the keys do not overlap one another (step S120). The focus display processing is performed to change the display contents on the key input unit 104, thereby making user's key inputting smooth and preventing erroneous key touching. Note that the focus display processing may be carried out according to the method described in the first embodiment.

When the changed display position is decided by the focus display processing, the key is displayed on the changed display position (step S130). The display processing unit 140 generates the display drive information for changing the display positions of the keys of the key input unit 104, and drives and controls the display unit 112 based on the display drive information. In this manner, when a contact of the operating body to the display unit 112 is detected, the information processing apparatus 100 according to the present embodiment performs the focus display processing to display a key to be focused in an enlarged manner and to display the key at the position where the overlap between keys is avoided.

Meanwhile, in the same way as the first embodiment described above, the present embodiment may include a prediction unit (see FIG. 11) that predicts input information to be inputted by the user.

This completes the description of the information processing apparatus 100 according to the third embodiment and the display processing method for keys used by such apparatus. According to the present embodiment, the display sizes of the focus key are estimated to approach or contact on the display unit 112 by an operating body and keys in the periphery thereof are enlarged based on the area of the operating body, and the keys are displayed at positions that have been moved to avoid overlapping of the keys. By doing so, it is possible for the user to make a key input smoothly.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

In the above embodiments, the display panel includes an optical touch sensor for detecting an approach or contact of the operating body, but the present invention is not limited to the example. For example, an approach or contact of the operating body can be detected by using a typical capacitance touch sensor or resistive film touch sensor, for example. In a personal computer, for example, also when a mouse is used to operate a mouse cursor for key inputting, a distance from the mouse cursor position to each key is calculated, thereby performing the enlargement of the key to be focused and the overlap avoidance processing similarly to the above embodiments.

The display processing on the on-screen keyboard has been described in the above embodiments, but the present invention is not limited thereto. The information processing apparatus according to the above embodiments can be applied to menu selection on a home screen, track selection based on text or image such as jacket photograph in a music player, photograph selection in a photo viewer, thumbnail selection in an animation player, for example. Furthermore, the information processing apparatus according to the above embodiments can be applied to enlarged display of a specific portion and overlap avoidance processing therearound in a map application or Web browser.

The display panel including the display unit and the detection unit is provided together with the region control unit and the display processing unit for performing the key size enlargement and the overlap avoidance processing in the above embodiments, but the present invention is not limited thereto. The display panel can be separately provided from the region control unit and the display processing unit. For example, the key size enlargement and the overlap avoidance processing may be performed in a computer connected to the display panel, or the like.

The present application contains subject matter related to that disclosed in Japanese Priority Patent Application JP 2010-54934 filed in the Japan Patent Office on Mar. 11, 2010, the entire content of which is hereby incorporated by reference.

What is claimed is:

1. An information processing apparatus comprising:
a detecting unit detecting a contact area of an operating body and a pressing force applied by the operating body that presses a surface of a display unit displaying a plurality of input regions operated by the operating body; and
a region control unit operable when it has been determined from a detection result of the detecting unit that the contact area of the operating body is equal to or above a first predetermined value, or the operating body has pressed one of the input regions with a pressing force that is equal to or above a second predetermined value, to enlarge the input region being pressed by the operating body and to move at least one of the input regions so that adjacent input regions do not overlap one another.

2. The information processing apparatus according to claim 1,
wherein the region control unit comprises:
a size deciding unit deciding a size of the input region after enlargement depending on the pressing force of the operating body; and
an ideal position calculating unit calculating ideal positions where the adjacent input regions do not overlap each other after enlargement has been carried out.

3. The information processing apparatus according to claim 2,
wherein the ideal position calculating unit comprises:
an overlap avoidance region deciding unit deciding an overlap avoidance region that enables an input region to avoid overlapping other input regions after enlargement has been carried out;
a pair deciding unit deciding a pair of the adjacent input regions;
an ideal relative position deciding unit deciding ideal relative positions for the pair of adjacent input regions so that the corresponding overlapping avoidance regions do not overlap; and
an ideal position deciding unit calculating the ideal positions so as to minimize a difference between present relative positions of the corresponding overlap avoidance regions and the ideal relative positions.

4. An information processing apparatus according to claim 3,
wherein the ideal relative position deciding unit is operable when present positions of the overlap avoidance regions corresponding to the pair of input regions do not overlap, to set the present positions of the overlap avoidance regions as the ideal relative positions, and is operable when the present positions of the overlap avoidance regions corresponding to the pair of input regions overlap, to set positions where one of the overlap avoidance regions has been moved in a direction of a reference line that joins centers of the overlap avoidance regions so as to not overlap another of the overlapping avoidance regions as the ideal relative positions.

5. An information processing apparatus according to claim 2,
wherein the size deciding unit optimizes enlargement ratios of the input regions so that all of the input regions fit in a specified area.

6. An information processing apparatus according to claim 1,
further comprising a prediction unit predicting input information to be inputted by a user,
wherein the region control unit changes a display of the input region based on predicted input information that is input information predicted by the prediction unit.

7. An information processing apparatus according to claim 6,
wherein the prediction unit analyzes past input information that has already been inputted from the input regions and predicts an input region to be operated next to input the predicted input information as a next operation region, and
the region control unit changes a display of the predicted next operation region.

8. An information processing apparatus comprising:
a detecting unit detecting a contact area of an operating body in accordance with a state of the operating body with respect to a surface of a display unit displaying a plurality of input regions operated by the operating body; and
a region control unit operable when it has been determined from a detection result of the detecting unit that the contact area of the operating body is equal to or above a predetermined value, to enlarge one of the input regions that is being indicated by the operating body and to move at least one of the input regions so that adjacent input regions do not overlap one another.

9. An information processing apparatus according to claim 8,
wherein the detection unit detects the contact area of the operating body based on a pressing force of the operating body on the surface of the display unit.

10. An information processing apparatus according to claim 8,
wherein based on approach distances between the operating body and the surface of the display unit, the detection unit detects the contact area of the operating body specified from a distribution of the approach distances.

11. An information processing method comprising steps of:
detecting a contact area of an operating body and a pressing force applied by the operating body that presses a surface of a display unit displaying a plurality of input regions operated by the operating body; and
enlarging the input region being pressed by the operating body and moving at least one of the input regions so that adjacent input regions do not overlap one another when it has been determined from a detection result that the contact area of the operating body is equal to or above a first predetermined value, or the operating body has pressed one of the input regions with a pressing force that is equal to or above a predetermined value.

12. An information processing method comprising steps of:
detecting a contact area of an operating body in accordance with a state of the operating body with respect to a surface of a display unit displaying a plurality of input regions operated by the operating body; and
enlarging one of the input regions that is being indicated by the operating body and moving at least one of the input regions so that adjacent input regions do not overlap one another when it has been determined from a detection result that the contact area of the operating body is equal to or above a predetermined value.

13. A program for causing a computer to function as an information processing apparatus comprising a region control unit operable when it has been determined, based on a contact area of an operating body and a pressing force applied by the operating body that presses a surface of a display unit displaying a plurality of input regions operated by the operating body, that the contact area of the operating body is equal to or above a first predetermined value, or the operating body has pressed one of the input regions with a pressing force that is equal to or above a second predetermined value, to enlarge the input region being pressed by the operating body and to move at least one of the input regions so that adjacent input regions do not overlap one another.

14. A program for causing a computer to function as an information processing apparatus comprising
- an area calculating unit calculating a contact area of an operating body in accordance with a state of the operating body with respect to a surface of a display unit displaying a plurality of input regions operated by the operating body; and
- a region control unit operable when it has been determined that the area of the operating body calculated by the contact area calculating unit is equal to or above a predetermined value, to enlarge one of the input regions that is being indicated by the operating body and to move at least one of the input regions so that adjacent input regions do not overlap one another.

* * * * *